United States Patent
Miyamoto et al.

(10) Patent No.: US 6,683,134 B2
(45) Date of Patent: Jan. 27, 2004

(54) NONCRYSTALLINE POLYOLEFIN RESIN COMPOSITION

(75) Inventors: Masahiro Miyamoto, Kobe (JP); Hideki Kawai, Kobe (JP); Mamoru Kadokura, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/926,771

(22) PCT Filed: Apr. 19, 2001

(86) PCT No.: PCT/JP01/03339
§ 371 (c)(1),
(2), (4) Date: Dec. 18, 2001

(87) PCT Pub. No.: WO01/81461
PCT Pub. Date: Nov. 1, 2001

(65) Prior Publication Data
US 2003/0027926 A1 Feb. 6, 2003

(30) Foreign Application Priority Data
Apr. 21, 2000 (JP) .............................. 2000-121514

(51) Int. Cl.$^7$ .............................................. C08G 63/48
(52) U.S. Cl. .............................. 525/70; 595/88; 595/82
(58) Field of Search ................ 525/70, 82, 88

(56) References Cited

U.S. PATENT DOCUMENTS

| | | | |
|---|---|---|---|
| 5,574,100 A | 11/1996 | Sagane et al. | |
| 5,733,975 A | 3/1998 | Aoyama et al. | |
| 5,770,655 A * | 6/1998 | Sagane et al. | 525/310 |
| 6,008,298 A | 12/1999 | Hatke et al. | 525/210 |
| 6,225,407 B1 | 5/2001 | Jacobs et al. | 525/70 |
| 6,395,829 B1 * | 5/2002 | Miyamoto et al. | 525/88 |

FOREIGN PATENT DOCUMENTS

| | | |
|---|---|---|
| EP | 0 575 809 A2 | 12/1993 |
| JP | 5-339433 | 12/1993 |
| JP | 5-339434 | 12/1993 |
| JP | 6-73192 | 3/1994 |
| JP | 6-299006 | 10/1994 |

\* cited by examiner

*Primary Examiner*—James J. Seidleck
*Assistant Examiner*—Olga Asinovsky
(74) *Attorney, Agent, or Firm*—Westerman, Hattori, Daniels & Adrian LLP

(57) ABSTRACT

Amorphous polyolefin resin compositions having an impact resistance remarkably improved without impairing the transparency by an impact modifier which can be prepared from easily available raw materials by a general polymerization method, the compositions containing as the impact modifier a core-shell elastomer obtained by graft polymerization of a monomer mixture of an alkyl (meth)acrylate with an alkyl group having 3 to 8 carbon atoms, an alkyl (meth)acrylate with an alkyl group having 2 or less carbon atom or a vinyl cyanide compound, and an aromatic vinyl monomer in a specific ratio in the presence of a conjugated diene copolymer rubber.

10 Claims, No Drawings

NONCRYSTALLINE POLYOLEFIN RESIN COMPOSITION

TECHNICAL FIELD

The present invention relates to an amorphous polyolefin resin composition having good transparency and impact resistance, and more particularly to an amorphous polyolefin resin composition containing a core-shell elastomer which is effective for improving the impact resistance of the amorphous polyolefin with minimum loss of the transparency of the amorphous polyolefin.

BACKGROUND ART

Cyclic olefin polymers (including copolymers) which are one type of amorphous polyolefins, have lately attracted attention as plastics having excellent moldability, dimensional stability, transparency and moisture barrier. However, the impact strength thereof is not sufficient and, therefore, improvement in impact resistance has been conventionally investigated. It has been demanded to improve the impact resistance of cyclic olefin polymers with maintaining an excellent transparency that the cyclic olefin polymers possess.

It is generally known that alloying brittle thermoplastic resins with rubber components incompatible therewith enhances the impact resistance. This manner is also effective for cyclic olefin polymers. For example, JP-A-7-233301, JP-A-7-233302 and JP-A-7-300540 disclose improving the impact resistance of amorphous polyolefins by incorporating core-shell elastomers therein.

JP-A-7-233301 and JP-A-7-233302 disclose that core-shell elastomers are effective for improving the impact resistance of cyclic olefin polymers which are one type of amorphous polyolefins. However, it cannot be said that the degree of improvement in impact resistance and the level of transparency are sufficient. No countermeasure to further improve them is disclosed therein.

JP-A-7-300540 discloses that core-shell elastomers wherein the graft layer (shell layer) is formed by graft polymerization of cycloalkyl (meth)acrylates, are effective for improving the impact resistance of cyclic olefin copolymers. However, since cycloalkyl (meth)acrylates are industrially special monomers and are also very low in solubility in water, emulsion polymerization or seed polymerization which has been generally used in industrial production of core-shell elastomers is hard to apply to the cycloalkyl (meth)acrylates as a satisfactory, simple and easy method.

An object of the present invention is to provide an amorphous polyolefin resin composition having an improved impact resistance without remarkably deteriorating excellent transparency of the amorphous polyolefin resins.

A further object of the present invention is to provide a core-shell graft copolymer which can be prepared by a general polymerization method with the use of easily available raw materials and which is suitable for improvement in impact resistance of amorphous polyolefins.

DISCLOSURE OF INVENTION

The present inventors have found that core-shell elastomers useful for improvement in impact resistance of amorphous polyolefins are obtained without using any industrially special cycloalkyl (meth)acrylates by graft-polymerizing a monomer mixture containing an easily available linear or branched alkyl (meth)acrylate and an aromatic vinyl monomer onto a conjugated diene copolymer rubber.

Thus, in accordance with the present invention, there is provided an amorphous polyolefin resin composition comprising (A) 1 to 40% by weight of a core-shell elastomer and (B) 99 to 60% by weight of an amorphous polyolefin, wherein said core-shell elastomer (A) is a core-shell elastomer prepared by graft polymerization of a graft component (A-2) in the presence of a copolymer rubber (A-1) of not less than 50% by weight of a conjugated diene monomer and not more than 50% by weight of at least one vinyl monomer copolymerizable therewith, in which said graft component (A-2) is a mixture of 1 to 99% by weight of at least one aromatic vinyl monomer and 99 to 1% by weight of a monomer mixture of (Ml) a linear and/or branched alkyl (meth)acrylate with a $C_3$ to $C_8$ alkyl group and (M2) at least one monomer selected from the group consisting of alkyl (meth)acrylates with an alkyl group having 2 or less carbon atom and vinyl cyanide monomers in an M1/M2 ratio of 99/1 to 30/70 by weight.

The core-shell elastomer in the present invention is preferably a core-shell elastomer having a shell layer of a multilayer structure from the viewpoint of balance between transparency and impact resistance.

Thus, in accordance with a preferable embodiment of the present invention, there is provided an amorphous polyolefin resin composition comprising (A) 1 to 40% by weight of a core-shell elastomer and (B) 99 to 60% by weight of an amorphous polyolefin, wherein said core-shell elastomer (A) is a core-shell elastomer (A') having a multilayer structure prepared by graft-polymerizing either of graft component (A-2) and graft component (A-2') and then the other in the presence of a copolymer rubber (A-1) of not less than 50% by weight of a conjugated diene monomer and not more than 50% by weight of at least one vinyl monomer copolymerizable therewith, in which said graft component (A-2) is a mixture of 1 to 99% by weight of at least one aromatic vinyl monomer and 99 to 1% by weight of a monomer mixture of (M 1) a linear and/or branched alkyl (meth)acrylate with a $C_3$ to $C_8$ alkyl group and (M2) at least one monomer selected from the group consisting of alkyl (meth)acrylates with an alkyl group having 2 or less carbon atom and vinyl cyanide monomers in an M1/M2 ratio of 99/1 to 30/70 by weight, and said graft component (A-2') is a mixture of 0 to 100% by weight of a linear and/or branched alkyl (meth)acrylate with a $C_3$ to $C_8$ alkyl group (M 1), 0 to 50% by weight of at least one monomer (M2) selected from the group consisting of alkyl (meth)acrylates with an alkyl group having 2 or less carbon atom and vinyl cyanide monomers, and 50 to 100% by weight of an aromatic vinyl monomer.

As the copolymer rubber (A-1) which constitutes the core are used, for example, styrene-butadiene rubber, styrene-butadiene-isoprene rubber and the like. The core of the core-shell elastomer in the present invention is able to have a multilayer structure. Copolymer rubbers (A-1) having a multilayer structure which are obtained by radical polymerization of a monomer component comprising 50 to 100% by weight a conjugated diene monomer and 50 to 0% by weight of at least one vinyl monomer copolymerizable with the diene monomer in the presence of a copolymer rubber of a conjugated diene monomer and at least one vinyl monomer copolymerizable with the diene monomer, are preferably used as the core from the viewpoint of the transparency and/or the impact resistance. The multilayer structure copolymer rubbers having an average particle size of 0.05 to 0.30 μm are particularly preferred.

The core-shell elastomers of the present invention are applicable to amorphous polyolefins and, in particular, are suitable for improvement in impact resistance of cyclic olefin homopolymers and copolymers such as cyclic olefin addition copolymers composed of α-olefin and cyclic olefin, cyclic olefin addition copolymers composed of ethylene, cyclic olefin and α-olefin, and hydrogenation products of homopolymers and copolymers by ring-opening polymerization of cyclic olefins.

BEST MODE FOR CARRYING OUT THE INVENTION

Core-Shell Elastomer (A)

The core-shell elastomer (A) is composed of a core and a shell layer which covers a part or whole of the surface of the core. Core-shell elastomers may be used alone or in admixture thereof as the component (A) so long as they satisfy the requirements of the present invention.

The core is made of a copolymer rubber (A-1) of at least 50% by weight, preferably 70 to 90% by weight, more preferably 80 to 88% by weight, of a conjugated diene monomer and at most 50% by weight of at least one vinyl monomer copolymerizable with the diene monomer. If the proportion of the conjugated diene monomer in the copolymer rubber (A-1) which constitutes the core is low, the effect of improving the impact resistance of amorphous polyolefins tends to be not sufficient.

The copolymer rubber (A-1) can be prepared by known methods, and emulsion polymerization is particularly preferred.

It is preferable that the copolymer rubber (A-1) has a glass transition temperature (Tg) of less than 0° C., especially not more than −30° C.

Preferable conjugated diene monomers include, for instance, butadiene, isoprene and chloroprene, but other conjugated diene compounds can be used. Butadiene is particularly preferred.

Examples of the vinyl monomer copolymerizable with the conjugated diene monomer are, for instance, alkyl (meth) acrylates, substituted alkyl (meth)acrylates wherein substituted alkyl groups include, for instance, arylalkyl groups, haloalkyl groups, and the like, aryl (meth)acrylates, aromatic vinyl monomers, vinyl cyanide monomers, and the like. The vinyl monomers copolymerizable with the conjugated diene monomer may be used alone or in admixture thereof.

The alkyl (meth)acrylates include, for instance, alkyl (meth)acrylates having a $C_4$ to $C_{12}$ alkyl group such as butyl (meth)acrylate, 2-ethylhexyl acrylate and lauryl methacrylate. The substituted alkyl (meth)acrylates include, for instance, aryl-substituted alkyl (meth)acrylates such as 2-phenylethyl (meth)acrylate and benzyl (meth)acrylate, haloalkyl (meth)acrylates such as 2-chloroethyl (meth) acrylate, and the like. The aryl (meth)acrylates include, for instance, phenyl (meth)acrylate, naphthyl (meth)acrylate, and the like. The aromatic vinyl monomers include, for instance, styrene; an α-substituted styrene such as α-methylstyrene; an alkylstyrene such as methylstyrene or 4-butylstyrene; a halostyrene such as chlorostyrene, fluorostyrene or bromostyrene; 4-phenylstyrene and other nuclear-substituted styrene compounds; vinylnaphthalene; indene; and the like. The vinyl cyanide monomers include, for instance, (meth)acrylonitrile, substituted acrylonitrile, and the like.

The copolymer rubber (A-1) which constitutes the core may be crosslinked and, therefore, can contain 0 to 5% by weight of a polyfunctional monomer. If the content of the polyfunctional monomer exceeds 5% by weight, the impact resistance of resin compositions tends to lower, Examples of the polyfunctional monomer are, for instance, a divinyl compound such as divinyl benzene, a di(meth)acrylate compound such as butanediol dimethacrylate, an ally compound such as trially (iso)cyanulate, allyl methacrylate, diallyl itaconate or diallyl phthalate, and other known crosslinking monomers.

In the preparation of the copolymer rubber (A-1), a chain transfer agent can be used in order to adjust the molecular weight or the degree of crosslinking. As the chain transfer agent are mentioned, for instance, known chain transfer agents such as alkyl mercaptans having 5 to 20 carbon atoms.

The core (A-1) may have a multilayer structure. In one of preferable embodiments of the present invention, as the core (A-1) is used a copolymer rubber having a multilayer structure obtained by conducting radical polymerization of a monomer mixture of 50 to 100% by weight of a conjugated diene monomer and 50 to 0% by weight of at least one vinyl monomer copolymerizable therewith in one or more stages in the presence of a copolymer of a conjugated diene monomer and at least one vinyl monomer copolymerizable therewith. In case of conducting the polymerization in multi-stages, the compositions of monomers in respective stages may be different from each other. The copolymer which constitutes the innermost layer of the core may contain an arbitrary amount of the conjugated diene monomer, but the amount of the conjugated diene monomer included in the core (A-1) as a whole is not less than 50% by weight. It is particularly preferable that the average particle size of such a rubber having a multilayer structure is within the range of 0.05 to 0.3 μm.

The proportion of the innermost layer in the copolymer rubber (A-1) having a multilayer structure is not particularly limited, but is usually from 50 to 70% by weight.

In the copolymer rubber (A-1) having a multilayer structure, the copolymer of the innermost layer may have a glass transition temperature (Tg) of not less than 0° C. However, the glass transition temperature of a polymer of each of the layers other than the innermost layer is less than 0° C., preferably not more than 30° C. In case that the Tg of the innermost layer is less than 0° C., it is preferable that this Tg is higher than Tg of the layers other than the innermost layer.

The content of the core in the core-shell elastomer (A) is from 40 to 95% by weight, preferably from 50 to 80% by weight. If the content is less than 40% by weight, there is a case where an effect of improving the impact resistance is not exhibited. If the content is more than 95% by weight, the core-shell elastomer tends to be inferior in handling in the preparation thereof.

Examples of the copolymer rubber (A-1) are, for instance, styrene-butadiene rubber, styrene-butadiene-isoprene rubber, styrene-butadiene-chloroprene rubber, and the like.

The core-shell elastomer (A) can be prepared by graft-polymerizing a graft component in a single stage or multi-stages in the presence of the copolymer rubber (A-1).

The shell layer of the core-shell elastomer (A) used in the present invention comprises at least one layer formed from graft component (A-2).

The graft component (A-2) is a mixture of (1) 1 to 99% by weight of a monomer mixture of (M1) a linear and/or branched alkyl (meth)acrylate with a $C_3$ to $C_8$ alkyl group (not including cyclic alkyl group), preferably a $C_3$ to $C_6$ alkyl group, and (M2) at least one monomer selected from the group consisting of alkyl (meth)acrylates with an alkyl group having 2 or less carbon atom and vinyl cyanide compounds, and (2) 99 to 1% by weight of at least one aromatic vinyl monomer. The (1)/(2) ratio of the monomer (1) to the monomer (2) is preferably from 10/90 to 90/10 by weight, more preferably from 30/70 to 70/30 by weight. If the component (M1) is an alkyl (meth)acrylate with an alkyl group having 9 or more carbon atoms, there is a tendency that handling in the preparation of core-shell elastomer is deteriorated or the alkyl (meth)acrylate is introduced into the core-shell elastomer with difficulty in industrial production. If the aromatic vinyl monomer (2) is not used or if the monomer (M2) selected from the group consisting of alkyl (meth)acrylates and vinyl cyanide compounds is not used, the balance between the transparency and the impact resistance of resin compositions tends to be insufficient.

In respect of the mixing ratio of the component (M1) and the component (M2) in the graft component (A-2), the proportion of component (M1) is from 99 to 30% by weight, preferably from 95 to 30% by weight, and the proportion of component (M2) is from 1 to 70% by weight, preferably from 5 to 70% by weight, respectively, based on the total of the components (M1) and (M2). If the proportion of the component (M2) is more than 70% by weight, there is a tendency that it is difficult to obtain improvement in Izod impact strength.

The polymerization of the graft component (A-2) may be conducted in a single stage to produce a shell of single layer, or the graft component (A-2) may be divided into two or more portions and graft-polymerized in multistages to produce a shell of two or more layers, provided that in case of the latter case, each layer of the shell satisfies the requirements of the graft component (A-2).

In a preferable embodiment of the present invention, the shell layer of the core-shell elastomer (A) comprises a layer formed by polymerization of graft component (A-2) and a layer formed by polymerization of graft component (A-2'). Such a core-shell elastomer has a good balance of transparency and impact resistance.

The graft component (A-2') is a mixture of 0 to 100% by weight of the linear and/or branched alkyl (meth)acrylate with a $C_3$ to $C_8$ alkyl group (not including cyclic alkyl group), 0 to 50% by weight of at least one monomer (M2) selected from the group consisting of alkyl (meth)acrylates with an alkyl group having 2 or less carbon atom and vinyl cyanide monomers, and 50 to 100% by weight of an aromatic vinyl monomer. If the component (M1) is an alkyl (meth)acrylate with an alkyl group having 9 or more carbon atoms, there is a tendency that handling in the preparation of core-shell elastomer is deteriorated or the alkyl (meth) acrylate is introduced into the core-shell elastomer with difficulty in industrial production. Core-shell elastomers having a better balance of transparency and strength can be obtained by providing a shell layer made of a graft component containing a major amount of an aromatic vinyl monomer like the graft component (A-2').

The order of graft-polymerizing the graft component (A-2) and the graft component (A-2>) in the presence of the copolymer rubber (A-1) is not particularly limited. The shell layer is formed by firstly graft-polymerizing either of the graft components (A-2) and (A-2') and then graft-polymerizing the other. Also the grafting state of shell layer (A-2) and shell layer (A-2') is not particularly limited. For example, the second shell layer may cover the whole of the first shell layer which covers the whole surface of a core or a part of the first shell layer which covers the whole surface of a core, or may cover a core surface which is not covered by the first shell layer and is exposed to. Each of the graft components (A-2) and (A-2') may be divided into two or more portions and subjected to graft polymerization to form a shell layer having a three or more layer structure.

The ratio of the graft component (A-2) to graft component (A-2'), namely (A-2)/(A-2') ratio, is from 95/5 to 5/95 by weight, preferably 90/10 to 60/40 by weight.

Examples of the linear and/or branched alkyl (meth) acrylate having a $C_3$ to $C_8$ alkyl group (M1) used in the graft components (A-2) and (A-2') are, for instance, propyl (meth) acrylate, isopropyl (meth)acrylate, butyl (meth)acrylate, isobutyl (meth)acrylate, hexyl (meth)acrylate, octyl (meth) acrylate, 2-ethylhexyl (meth)acrylate, and the like. These (meth)acrylates may be used alone or in admixture thereof.

Examples of the alkyl (meth)acrylate with an alkyl group having 2 or less carbon atom used in the graft components (A-2) and (A-2') are methyl acrylate, ethyl acrylate, methyl methacrylate and ethyl methacrylate. These may be used alone or in admixture thereof.

Examples of the vinyl cyanide compound used in the graft components (A-2) and (A-2') are, for instance, acrylonitrile, methacrylonitrile, a substituted acrylonitrile, and the like. These may be used alone or in admixture thereof.

Examples of the aromatic vinyl monomer used in the graft components (A-2) and (A-2') are, for instance, styrene, α-substituted styrene compounds such as α-methylstyrene; nuclear-substituted styrene compounds, e.g., an alkylstyrene such as methylstyrene or butylstyrene, a halostyrene such as chlorostyrene, fluorostyrene or bromostyrene, and 4-phenylstyrene; vinylnaphthalene; indene; and the like.

From the viewpoint of distinguishing from the core rubber layer, the glass transition temperature of a polymer which constitutes the shell layer is preferably not less than 0° C., more preferably not less than 20° C., the most preferably not less than 40° C.

The content of the shell layer in the core-shell elastomer (A) is preferably from 5 to 60% by weight, more preferably from 20 to 50% by weight, the most preferably from 20 to 30% by weight. If the content is less than 5% by weight, there is a tendency that handling in the preparation of the core-shell elastomer is deteriorated. If the content is more than 60% by weight, there is a case where the effect of improving the impact resistance is not exhibited.

At least one layer of the shell may be crosslinked and accordingly the graft component can contain a polyfunctional monomer. The amount of the polyfunctional monomer is from 0 to 5% by weight based on the total of the monomers used in the graft component. Examples of the polyfunctional monomer are, for instance, a divinyl compound such as divinyl benzene, a di(meth)acrylate compound such as butane diol di(meth)acrylate, an allyl compound such as triallyl isocyanurate, allyl (meth)acrylate, diallyl itaconate or diallyl phthalate, and other known crosslinking monomers.

The molecular weight of the polymer which constitutes the shell layer can be adjusted by using a chain transfer agent in the graft polymerization of graft component. As the chain transfer agent can be used known chain transfer agents such as alkyl mercaptans having 5 to 20 carbon atoms.

The formation of the shell layer can be conducted by known methods, and emulsion polymerization and seed polymerization are particularly preferred. In the formation of the shell layer, the whole monomer mixture may be added at once, or the whole or part of the monomer mixture may be continuously added.

The core-shell elastomer can be prepared, for example, by methods disclosed in U.S. Pat. No. 3,833,682 and U.S. Pat. No. 3,787,522.

It is preferable that the primary particles of the core-shell elastomer have an average particle size of 0.02 to 0.5 μm, especially 0.05 to 0.3 μm. If the average particle size is less than 0.02 μm or more than 0.5 μm, there is a tendency that it is difficult to prepare the core-shell elastomer (A) in a simple manner and in a high productivity.

The average particle size of the copolymer rubber (A-1) and the core-shell elastomer can be measured by known methods, for example, can be measured in the state of a latex by a light scattering method (dynamic light scattering method).

Amorphous Polyolefin (B)

The amorphous polyolefins used in the present invention are substantially amorphous, and preferably they are transparent and have a modulus of elasticity in bending of at least 2,000 MPa.

Cyclic olefin homopolymers and copolymers are preferred as the amorphous polyolefins. The cyclic olefin (co) polymers include, for instance, (B-1) cyclic olefin addition copolymers of non-cyclic olefins such as α-olefins and cyclic olefins, (B-2) cyclic olefin addition copolymers of ethylne, cyclic olefins and α-olefins, (B-3) hydrogenated homopolymers and copolymers prepared by ring opening polymerization of cyclic olefins, and the like.

The cyclic olefin copolymers (B-1) and (B-2) are amorphous polymers having a cyclic olefin structure, and preferably have a glass transition temperature of 70 to 160° C., especially 70 to 140° C., more especially 70 to 100° C.

Examples of the cyclic olefin copolymers (B-1) and (B-2) are, for instance, polymers comprising 1 to 99% by weight, preferably 20 to 90% by weight, of units of at least one cyclic olefin monomer, 99 to 1% by weight, preferably 80 to 10% by weight, of units of at least one non-cyclic olefin monomer, and 0 to 20% by weight of units of other vinyl monomers having at least one double bond.

Preferable examples of the cyclic olefin are, for instance, cyclic olefins of the formulas (I), (II), (III), (IV), (V), (VI) and (VII) described below. Preferable examples of the non-cyclic olefin are, for instance, non-cyclic olefins of the formula (VIII) described below. Examples of the other vinyl monomers are, for instance, (meth)acrylic m acid, alkyl (meth)acrylates, (meth)acrylonitrile, vinyl acetate, styrene, α-methylstyrene, and the like.

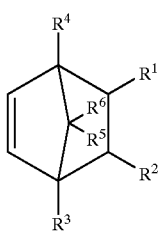
(I)

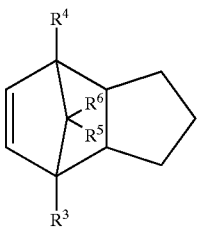
(II)

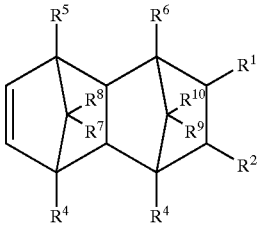
(III)

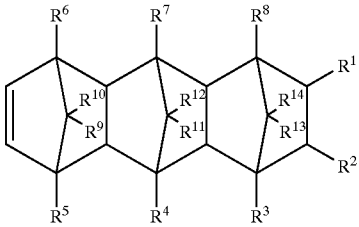
(IV)

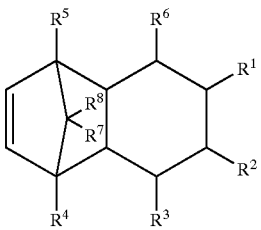
(V)

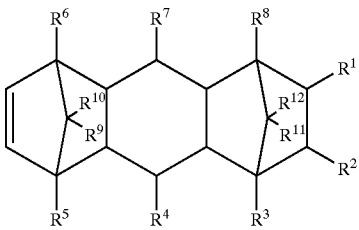
(VI)

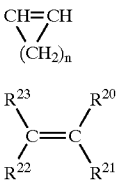
(VII)

(VIII)

$$\begin{array}{c} R^{23} \\ R^{22} \end{array} C=C \begin{array}{c} R^{20} \\ R^{21} \end{array}$$

In the formulas (I) to (VI), $R^1$ to $R^{14}$ are the same or different and each is hydrogen atom or a hydrocarbon group having 1 to 20 carbon atoms, e.g., a linear or branched alkyl group having 1 to 8 carbon atoms, an aryl group having 6 to 18 carbon atoms and an alkylenearyl group having 7 to 20 carbon atoms, provided that at-least two of $R^1$ to $R^{14}$ may be joined to form a ring. In the formula (VII), n is from 2 to 10. In the formula (VIII), $R^{20}$ to $R^{23}$ are the same or different and each is hydrogen atom or a hydrocarbon group having 1 to 20 carbon atoms, e.g., a linear or branched alkyl group having 1 to 8 carbon atoms and an aryl group having 6 to 18 carbon atoms.

Preferable cyclic olefin copolymers (B-1) and (B-2) include, for instance, polymers composed of a cyclic olefin having a norbornene based structure and a non-cyclic olefin having a terminal double bond, especially polymers composed of a cyclic olefin having a norbornene or tetracyclodedecene structure (compounds of the formulas I and III) and an α-olefin. Preferable α-olefins are ethylene and propylene. Typical examples of preferable cyclic olefin copolymers (B-1) and (B-2) are, for instance, norbornene/ethylene copolymer, norbornene/propylene copolymer, tetracyclododecene/ethylene copolymer and tetracyclododecene/propylene copolymer.

The cyclic olefin copolymers suitable for the objects of the present invention have a viscosity number of 25 to 200 ml/g, preferably 40 to 80 ml/g, more preferably 40 to 80 ml/g, measured in decalin at 135° C.

Commercially available polymers, e.g., those available under the trade mark "TOPAS" made by TICONA GmbH, Germany, and the trade mark "APEL" made by Mitsui Chemicals Inc. can also be used as the cyclic olefin addition copolymers.

The hydrogenated (co)polymers (A-3) prepared by ring opening polymerization of cyclic olefins can be prepared, for example, by subjecting cyclic olefins to ring opening (co)polymerization and then to reduction with hydrogen. The cyclic olefins include, for instance, norbornene compounds such as bicyclo[2,2,1]-2-heptene and 9-methyl-9-carboxymethyltetracyclo[4,4,0,17,10]-3-dodecene.

The ring opening polymerization of cyclic olefins can be conducted, for example, in a catalytic system containing a transition metal compound or a platinum group metal compound and an organometallic compound such as an organoaluminum compound and optionally in the presence of an additive such as an aliphatic or aromatic tertiary amine at a temperature of −30 to 120° C. under a pressure of 0 to 50 kg/cm$^2$G. The reduction with hydrogen (hydrogenation) can be conducted in the presence of a usual hydrogenation catalyst.

As the hydrogenated polymer (A-3) can also be used those commercially available such as "ZEONEX" and "ZEONOR" which are products of Zeon Corporation, and "ARTON" which is products of JSR Corporation.

Resin Composition

The resin composition of the present invention comprises 1 to 40% by weight of core-shell elastomer (A) and/or core-shell elastomer (A') and 99 to 60% by weight of amorphous polyolefin (B).

In order to retain excellent transparency of amorphous polyolefins, it is preferable that the absolute value of the difference in refractive index nD between the core-shell elastomer (A) and the amorphous polyolefin (B) is not more than 0.005, and the absolute value of the difference in refractive index nD between the core (A-1) of the core-shell elastomer (A) and the amorphous polyolefin (B) is not more than 0.010. Such a resin composition exhibits not only excellent impact resistance, but also good transparency. If the nD difference exceeds the above range, the transparency of the resin compositions tends to lower.

It becomes easy to balance the transparency and the appearance of resin compositions by setting the value (ΔnD) obtained by subtracting the nD value of amorphous polyolefin (B) from the nD value of core-shell elastomer (A) within the range of +0.002 to −0.004, particularly at not more than 0.

The core-shell elastomer (A) may be in the state of being agglomerated to form colonies (aggregates) in the amorphous polyolefin (B). However, it is preferable that colonies having a size of more than 3 μm, especially more than 2 μm, are not present. If colonies having a size of more than 3 μm are present, a problem may arise in the impact resistance and transparency of resin compositions. When no colony having a size of more than 1 μm is present, the resin compositions are particularly superior in transparency and a very high impact strength can be achieved when formed into sheet and film. Such a state can be confirmed by a TEM photograph (transmission electron microphotograph) observed by ultra thin cutting method The resin compositions of the present invention can also be used as a masterbatch.

The resin compositions of the present invention are obtained by mixing core-shell elastomer and amorphous polyolefin in a conventional manner by an extruder, a mixer, a kneader or the like. The resin compositions of the present invention can also be prepared from resin compositions (masterbatch) prepared by mixing the core-shell elastomer (A) and the amorphous polyolefin (B) in a ratio outside the range mentioned above.

The resin compositions of the present invention can be molded by known methods. For example, there can be used Banbury mixer, roll mill, single screw extruder, twin screw extruder, twin conical screw extruder, Brabender, injection molding machine, direct blow molding machine, stretch blow molding machine and the like. For example, the compositions can be processed into molded articles, sheets, films and the like by press molding, extrusion, injection molding, blow molding, calendering, inflation molding, vacuum forming, uniaxial stretching, biaxial stretching and the like.

The resin compositions of the present invention can contain usual additives in amounts within the ranges conventionally used, e.g., plasticizer, ultraviolet absorber, thermal stabilizer, antioxidant,-peroxide decomposing agent, antistatic agent, external lubricant, internal lubricant, tonor and the like.

The resin compositions of the present invention are particularly suitable for bottles, cups, medical materials (e.g., blister package, and film for packaging drugs), extrusion films (e.g., film for packing), films for packaging foods, injection moldings and the like.

Examples of the present invention are shown below. It is to be understood, however, that the Examples are for purpose of illustration only and the present invention is not limited thereto. In the following description, all % and parts are by weight unless otherwise noted.

Copolymer rubber (A-1) (core component) used for the preparation of core-shell elastomers in the following Examples was prepared as follows:

Preparation of Core Component (A-1) of Core-shell Elastomer (1) An autoclave flushed with nitrogen gas was charged with the raw materials according to the following recipe, and the reaction was carried out at 60° C. for 20 hours with stirring.

| | |
|---|---|
| Butadiene | 76 parts |
| Styrene | 24 parts |
| Diisopropylbenzene hydroperoxide | 0.3 part |
| Iron(I) sulfate | 0.01 part |

-continued

| | |
|---|---|
| Formaldehyde sodium sulfoxylate | 0.3 part |
| Potassium oleate | 1 part |
| Pure water | 220 parts |

The conversion of this reaction was 99%, and a latex of a styrene-butadiene rubber (SBR) having an average particle size of 0.10 μm was obtained.

(2) An autoclave was charged with the SBR latex obtained in (1), flushed with nitrogen gas and was further charged with raw materials according to the following recipe. The reaction was carried out at 60° C. for 20 hours with stirring.

| | |
|---|---|
| SBR latex obtained in (1) | 20 parts (solid basis) |
| Butadiene | 60.8 parts |
| Styrene | 19.2 parts |
| Diisopropylbenzene hydroperoxide | 0.15 part |
| Iron(I) sulfate heptahydrate | 0.002 part |
| Formaldehyde sodium sulfoxylate | 0.2 part |
| Potassium oleate | 1 part |
| Pure water | 130 parts |

After 7 and 14 hours from starting the reaction, 0.5 part of potassium oleate was added for each time, and after 10 and 16 hours, 0.1 part of diisopropylbenzene hydroperoxide and 0.1 part of formaldehyde sodium sulfoxylate were added for each time.

The conversion of this reaction was 98%, and a latex of a styrene-butadiene rubber having an average particle size of 0.17 μm was obtained.

The obtained styrene-butadiene rubber latex having an average particle size of 0.17 μm was used as core component (A-1) in the following Examples.

In the Examples, the following cyclic olefin copolymer was used as amorphous polyolefin (B).

Amorphous Polyolefin (B)

(1) TOPAS 8007 (trade mark, product of TICONA GmbH)

(2) APEL 6509T (trade mark, product of Mitsui Chemicals Inc.)

The found values of refractive index (nD) at 589 nm were 1.531 for TOPAS 8007 and 1.538 for APEL 6509T.

Measurement and evaluation of physical properties of resin compositions were conducted by the following methods.

Measurement and Evaluation of Physical Properties of Resin Compositions

After dry-blending predetermined amounts of raw materials, the resulting mixture was melt-kneaded at 220° C. by a twin-screw extruder (TEX-30HSS made by The Japan Steel Works, Ltd.) and pelletized. The pellets were injection-molded (using an injection molding machine model FAS-75D made by FANUC and a specified mold) at a nozzle temperature of 250° C., or press-molded at a molding temperature of 220° C. to give test specimens.
(1) Izod Impact Strength (V-notched)

Evaluated according to JIS K 7110. The specimens were prepared by injection molding to have a size of 1.0 cm in width and 6 mm in thickness.
(2) Transparency (Total light transmission and haze) Using flat plate specimens having a thickness of 1 mm prepared by heat press molding, total light transmission (Tt %) and haze were measured at 23° C. according to JIS K 7105 by NDH-Σ80 made by Nippon Denshoku Kabushiki Kaisha.

EXAMPLE 1

Raw materials were charged in a glass vessel according to the following recipe and stirred at 70° C.

| | |
|---|---|
| Pure water | 30 parts |
| Styrene-butadiene rubber latex (A-1) | 65 parts (solid basis) |
| Cumene hydroperoxide | 0.15 part |
| Iron(I) sulfate | 0.002 part |

The vessel was flushed with nitrogen gas, and graft polymerization was carried out by continuously adding the following monomer mixture to the vessel at 70° C. over 2 hours to form a shell layer.

| | |
|---|---|
| Butyl methacrylate | 19.4 parts |
| Methyl methacrylate | 1.3 parts |
| Styrene | 14.3 parts |

After the completion of the addition, 0.2 part of cumene hydroperoxide was added and the reaction was further continued for 2 hours to give a latex of a core-shell elastomer. The conversion after the reaction was 99%, and the average particle size of the obtained latex was 0.19 μm.

To this latex were added 1 part of 2,6-di-tert-butyl-p-cresol and 1 part of dilaurylthiodipropionate. After thoroughly stirring the latex, a 1% aqueous solution of calcium chloride was added to the latex to coagulate it, and the resulting slurry was dehydrated and dried to give a powder of core-shell elastomer.

The obtained core-shell elastomer powder was dry-blended with an amorphous polyolefin according to the recipe shown in Table 1, and the resulting mixture was melt-kneaded at 220° C. by a twin-screw extruder (TEX-30HSS made by The Japan Steel Works, Ltd.) and pelletized to give a resin composition.

The results of measurement of properties of the resin composition are shown in Table 1.

EXAMPLES 2-1 AND 2-2

Raw materials were charged in a glass vessel according to the following recipe and stirred at 70° C.

| | |
|---|---|
| Pure water | 30 parts |
| Styrene-butadiene rubber latex (A-1) | 70 parts (solid basis) |
| Cumene hydroperoxide | 0.15 part |
| Iron(I) sulfate | 0.002 part |

The vessel was flushed with nitrogen gas, and graft polymerization was carried out by continuously adding the following monomer mixture to the vessel over 2 hours to form a shell layer.

| | |
|---|---|
| Butyl methacrylate | 10 parts |
| Methyl methacrylate | 3 parts |
| Styrene | 17 parts |

After the completion of the addition, 0.2 part of cumene hydroperoxide was added and the reaction was further continued for 2 hours to give a latex of a core-shell elastomer. The polymerization conversion was 99%, and the average particle size of the obtained latex was 0.19 μm.

To this latex were added 1 part of 2,6-di-tert-butyl-p-cresol and 1 part of dilaurylthiodipropionate. After thoroughly stirring the latex, a 1% aqueous solution of calcium chloride was added to the latex to coagulate it, and the resulting slurry was dehydrated and dried to give a powder of core-shell elastomer.

The obtained core-shell elastomer powder was mixed with an amorphous polyolefin according to the recipe shown in Table 1, and a resin composition was obtained in the same manner as in Example 1. The results of measurement of properties of the resin composition are shown in Table 1.

EXAMPLE 3

Raw materials were charged in a glass vessel according to the following recipe and stirred at 70° C.

| | |
|---|---|
| Pure water | 30 parts |
| Styrene-butadiene rubber latex (A-1) | 70 parts (solid basis) |
| Cumene hydroperoxide | 0.15 part |
| Iron(I) sulfate | 0.002 part |
| Formaldehyde sodium sulfoxylate | 0.05 part |

The vessel was flushed with nitrogen gas, and graft polymerization was carried out by continuously adding the following first graft component to the vessel over 1 hour.

| | |
|---|---|
| Butyl methacrylate | 7.6 parts |
| Methyl methacrylate | 3 parts |
| Styrene | 14.4 parts |

After the completion of the addition, 0.1 part of cumene hydroperoxide was added and the reaction was further continued for 2 hours to form a first shell layer. The conversion after the reaction was 99%.

Graft polymerization was further continued by continuously adding to this latex 5 parts of styrene as a second graft component over 0.3 hour. After the completion of the addition, 0.2 part of cumene hydroperoxide was added and the reaction was further continued for 2 hours to form a second shell layer. The conversion after the reaction was 98%, and the average particle size of the obtained latex was 0.22 μm.

The thus obtained latex was treated in the same manner as in Example 1 to give a powder of core-shell elastomer. The obtained core-shell elastomer powder was mixed with an amorphous polyolefin according to the recipe shown in Table 1, and a resin composition was obtained in the same manner as in Example 1. The results of measurement of properties of the resin composition are shown in Table 1.

EXAMPLE 4

Raw materials were charged in a glass vessel according to the following recipe and stirred at 70° C.

| | |
|---|---|
| Pure water | 40 parts |
| Styrene-butadiene rubber latex (A-1) | 73 parts (solid basis) |
| Cumene hydroperoxide | 0.15 part |
| Iron(I) sulfate | 0.002 part |
| Formaldehyde sodium sulfoxylate | 0.05 part |

The vessel was flushed with nitrogen gas, and graft polymerization was carried out by continuously adding the following first graft component to the vessel over 1 hour.

| | |
|---|---|
| Butyl methacrylate | 3 parts |
| Methyl methacrylate | 6 parts |
| Styrene | 11 parts |

After the completion of the addition, 0.1 part of cumene hydroperoxide was added and the reaction was further continued for 2 hours to form a first shell layer. The conversion after the reaction was 99%.

Graft polymerization was further continued by continuously adding to this latex 7 parts of styrene as a second graft component over 0.4 hour. After the completion of the addition, 0.2 part of cumene hydroperoxide was added and the reaction was further continued for 2 hours to form a second shell layer. The conversion after the reaction was 98%, and the average particle size of the obtained latex was 0.22 μm.

The thus obtained latex was treated in the same manner as in Example 1 to give a powder of core-shell elastomer. The obtained core-shell elastomer powder was mixed with an amorphous polyolefin according to the recipe shown in Table 1, and a resin composition was obtained in the same manner as in Example 1. The results of measurement of properties of the resin composition are shown in Table 1.

EXAMPLE 5

A resin composition was prepared in the same manner as in Example 3 except that the first and second graft components were changed as shown below. The results are shown in Table 1.

| | |
|---|---|
| First graft component | |
| Butyl methacrylate | 9.5 parts |
| Methyl methacrylate | 2 parts |
| Styrene | 8.5 parts |
| Diallyl phthalate | 0.12 part (0.6%) |
| Second graft component | |
| Butyl methacrylate | 1 part |
| Styrene | 9 parts |

COMPARATIVE EXAMPLE 1

A resin composition was prepared in the same manner as in Example 1 except that the first graft component was changed as shown below. The results are shown in Table 1.

| First graft component | |
|---|---|
| Methyl methacrylate | 13 parts |
| Styrene | 17 parts |

Comparative Example 2

A resin composition was prepared in the same manner as in Example 3 except that the first and second graft components were changed as shown below. The results are shown in Table 1.

| First graft component | |
|---|---|
| Butyl acrylate | 2 parts |
| Methyl methacrylate | 10 parts |
| Styrene | 8 parts |
| Second graft component | |
| Styrene | 10 parts |

Comparative Example 3

A resin composition was prepared in the same manner as in Example 3 except that the first and second graft components were changed as shown below. The results are shown in Table 1.

| First graft component | |
|---|---|
| Butyl methacrylate | 1 parts |
| Methyl methacrylate | 10 parts |
| Styrene | 11 parts |
| Second graft component | |
| Styrene | 8 parts |

Comparative Examples 4 and 5

The impact resistance and transparency were measured with respect to only the amorphous polyolefins (B) without adding any core-shell elastomer thereto. The results are shown in Table 1.

TABLE 1

| | Core-shell elastomer (A) | | | | | | | |
|---|---|---|---|---|---|---|---|---|
| | Core component (A-1) part | Graft component — First graft component:part Monomer composition:% | Cross-linking agent part | Second graft component: part Monomer composition: % | Amorphous polyolefin (B) | (A)/(B) % | Izod impact resistance V-notched kg·cm/cm | Transparency Hz |
| Ex. 1 | 65 | 35 BMA:MMA:St = 55.4:3.7:40.9 BMA:MMA = 93.7:6.2 | — | — | TOPAS8007 | 20/80 | 40 | 5 |
| Ex. 2-1 | 70 | 30 BMA:MMA:St = 33.3:10:56.7 BMA:MMA = 72:28 | — | — | APEL6509T | 20/80 | 49 | 7 |
| Ex. 2-2 | 70 | 30 BMA:MMA:St = 33.3:10:56.7 BMA:MMA = 72:28 | — | — | APEL6509T | 10/90 | 19 | 5 |
| Ex. 3 | 70 | 25 BMA:MMA:St = 30.4:12:57.6 BMA:MMA = 62:38 | — | 5 St = 100 | APEL6509T | 20/80 | 45 | 6 |
| Ex. 4 | 73 | 20 BMA:MMA:St = 15:30:55 BMA:MMA = 33:67 | — | 7 St = 100 | APEL6509T | 20/80 | 48 | 7 |
| Ex. 5 | 70 | 20 BMA:MMA:St = 47.5:10:42.5 BMA:MMA = 83:17 | DPA 0.12 | 10 BMA:St = 10:90 | APEL6509T | 20/80 | 39 | 7 |
| Com. Ex. 1 | 70 | 30 MMA:St = 43.3:56.7 MMA = 100 | — | — | APEL6509T | 20/80 | 4 | 6 |
| Com. Ex. 2 | 70 | 20 BA:MMA:St = 10:50:40 BA:MMA = 16:7:83.3 | — | 10 St = 100 | APEL6509T | 20/80 | 5 | 5 |
| Com. Ex. 3 | 70 | 22 BMA:MMA:St = 4.5:45.5:50 BMA:MMA = 9:91 | — | 8 St = 100 | APEL6509T | 20/80 | 5 | 6 |
| Com. | — | — | — | — | APEL6509T | 0/100 | 3 | 2 |

TABLE 1-continued

| | Core-shell elastomer (A) | | | | | | | |
|---|---|---|---|---|---|---|---|---|
| | | Graft component | | | | | | |
| | Core component (A-1) part | First graft component:part Monomer composition:% | Cross-linking agent part | Second graft component: part Monomer composition: % | Amorphous polyolefin (B) | (A)/(B) % | Izod impact resistance V-notched kg·cm/cm | Transparency Hz |
| Ex. 4 | | | | | | | | |
| Com. Ex. 5 | — | — | — | — | TOPAS8007 | 0/100 | 3 | 2 |

In Table 1, Comparative Examples 4 and 5 show the physical properties of only amorphous polyolefin. The amorphous polyolefins have an excellent transparency, but a low Izod impact strength. From the results shown in Table 1, it would be understood that the amorphous polyolefin resin compositions of Examples 1 to 5 according to the present invention have an improved impact resistance, while loss of the transparency of polyolefins is held down.

In contrast, the resin composition of Comparative Example 1 does not have a sufficient Izod impact strength, since the graft component of the core-shell elastomer is composed of methyl methacrylate and styrene and accordingly does not contain any alkyl (meth)acrylate having a $C_3$ to $C_8$ alkyl group which is essential for the graft component.

The resin compositions of Comparative Examples 2 and 3 do not have a sufficient Izod impact strength. The reason is that the graft components of the core-shell elastomers are composed of butyl acrylate, methyl methacrylate and styrene, thus they contain butyl acrylate, but the ratio thereof to methyl methacrylate is low.

INDUSTRIAL APPLICABILITY

The amorphous polyolefin resin compositions of the present invention contain an impact modifier which can be prepared from easily available raw materials by a general polymerization method and have an impact resistance remarkably improved thereby without impairing excellent transparency that amorphous polyolefins possess and, therefore, are useful for various purposes, e.g., containers such as bottles and cups, packaging films and the like.

What is claimed is:

1. An amorphous polyolefin resin composition comprising (A) 1 to 40% by weight of a core-shell elastomer and (B) 99 to 60% by weight of an amorphous polyolefin,
   wherein said core-shell elastomer (A) is a core-shell elastomer prepared by graft polymerization of a graft component (A-2) in the presence of a copolymer rubber (A-1) of not less than 50% by weight of a conjugated diene monomer and not more than 50% by weight of at least one vinyl monomer copolymerizable therewith,
   in which said graft component (A-2) is a mixture of 1 to 99% by weight of at least one aromatic vinyl monomer and 99 to 1% by weight of a monomer mixture of (M1) a linear and/or branched alkyl (meth)acrylate with a $C_3$ to $C_8$ alkyl group and (M2) at least one monomer selected from the group consisting of alkyl (meth) acrylates with an alkyl group having 2 or less carbon atom and vinyl cyanide monomers in an M1/M2 ratio of 99/1 to 30/70 by weight.

2. The resin composition of claim 1, wherein said copolymer rubber (A-1) is a copolymer rubber having a multilayer structure and having an average particle size of 0.05 to 0.30 μm which is prepared by radical polymerization of a monomer component comprising 50 to 100% by weight of a conjugated diene monomer and 50 to 0% by weight of at least one vinyl monomer copolymerizable therewith in the presence of a copolymer of a conjugated diene monomer and at least one vinyl monomer copolymerizable therewith.

3. The resin composition of claim 1, wherein said amorphous polyolefin (B) is at least one member selected from the group consisting of (B-1) cyclic olefin addition copolymers comprising an α-olefin and a cyclic olefin, (B-2) cyclic olefin addition copolymers comprising ethylene, a cyclic olefin and an α-olefin, and (B-3) hydrogenated homopolymers or copolymers by ring-opening polymerization of cyclic olefins.

4. The resin composition of claim 1, wherein said copolymer rubber (A-1) is at least one member selected from the group consisting of a styrene-butadiene rubber and a styrene-butadiene-isoprene rubber.

5. An amorphous polyolefin resin composition comprising (A) 1 to 40% by weight of a core-shell elastomer and (B) 99 to 60% by weight of an amorphous polyolefin,
   wherein said core-shell elastomer (A) is a core-shell elastomer (A') having a multilayer structure prepared by graft-polymerizing either of graft component (A-2) and graft component (A-2') and then the other in the presence of a copolymer rubber (A-1) of not less than 50% by weight of a conjugated diene monomer and not more than 50% by weight of at least one vinyl monomer copolymerizable therewith,
   in which said graft component (A-2) is a mixture of 1 to 99% by weight of at least one aromatic vinyl monomer and 99 to 1% by weight of a monomer mixture of (M1) a linear and/or branched alkyl (meth)acrylate with a $C_3$ to $C_8$ alkyl group and (M2) at least one monomer selected from the group consisting of alkyl (meth) acrylates with an alkyl group having 2 or less carbon atom and vinyl cyanide monomers in an M1/M2 ratio of 99/1 to 30/70 by weight, and
   said graft component (A-2') is a mixture of 0 to 100% by weight of a linear and/or branched alkyl (meth)acrylate with a $C_3$ to $C_8$ alkyl group (M1), 0 to 50% by weight of at least one monomer (M2) selected from the group consisting of alkyl (meth)acrylates with an alkyl group having 2 or less carbon atom and vinyl cyanide monomers, and 50 to 100% by weight of an aromatic vinyl monomer.

6. The resin composition of claim 5, wherein said copolymer rubber (A-1) is a copolymer rubber having a multilayer structure and having an average particle size of 0.05 to 0.30 μm which is prepared by radical polymerization of a monomer component comprising 50 to 100% by weight of a conjugated diene monomer and 50 to 0% by weight of at least one vinyl monomer copolymerizable therewith in the presence of a copolymer of a conjugated diene monomer and at least one vinyl monomer copolymerizable therewith.

7. The resin composition of claim 5, wherein said amorphous polyolefin (B) is at least one member selected from the group consisting of (B-1) cyclic olefin addition copolymers comprising an α-olefin and a cyclic olefin, (B-2) cyclic olefin addition copolymers comprising ethylene, a cyclic olefin and an α-olefin, and (B-3) hydrogenated homopolymers or copolymers by ring-opening polymerization of cyclic olefins.

8. The resin composition of claim 5, wherein said copolymer rubber (A-1) is at least one member selected from the group consisting of a styrene-butadiene rubber and a styrene-butadiene-isoprene rubber.

9. The resin composition of claim 1, wherein the mixing ratio of the component (M1) and the component (M2) is from 95/5 to 30/70 by weight.

10. The resin composition of claim 5, wherein the mixing ratio of the component (M1) and the component (M2) is from 95/5 to 30/70 by weight.

* * * * *